United States Patent [19]

Gerdes

[11] 4,164,302
[45] Aug. 14, 1979

[54] CLOSURE CAP HAVING LOCKING MEANS

[75] Inventor: Theodor Gerdes, Langenfeld, Fed. Rep. of Germany

[73] Assignee: Blau KG Fabrik für Kraftfahrzeugteile, Langenfeld, Fed. Rep. of Germany

[21] Appl. No.: 927,335

[22] Filed: Jul. 24, 1978

[30] Foreign Application Priority Data

Jul. 29, 1977 [DE] Fed. Rep. of Germany ....... 2734394

[51] Int. Cl.² .............................................. B65D 55/14
[52] U.S. Cl. .................................... 220/210; 220/304; 70/172
[58] Field of Search ............... 220/203, 210, 302, 303, 220/304; 70/165-173

[56] References Cited

U.S. PATENT DOCUMENTS

| | | | |
|---|---|---|---|
| 4,000,633 | 1/1977 | Evans | 70/165 |
| 4,013,191 | 3/1977 | Gerdes | 220/210 X |
| 4,083,209 | 4/1978 | Sloan, Jr. | 220/303 |

Primary Examiner—George T. Hall
Attorney, Agent, or Firm—Blanchard, Flynn, Thiel, Boutell & Tanis

[57] ABSTRACT

A closure cover consisting of an inner cover member having a substantially cup-shape capable of engaging with the aperture to be closed, the cover member including a sealing flange adapted to co-operate with the edge of the opening, an overlapping outer cap member rotatably mounted on the circumference of the edge, which cap member has a centrally located, firmly seated hollow support member for a cylinder lock, the lock being rotatably mounted therein, the cap member being axially supported by a radially displaceable bolt, movement of said bolt being effected by an eccentric, whereby the cover is coupled to the inner cover component, and provided with a sleeve-shaped surrounding component with base closure at the bottom for sealing against the exterior, for a freely rotatably outer cap secured by a key when the inner cover component is firmly tightened on the socket opening wherein an inner cover member has a first cup-shaped member having a radially directed edge flange including a revertive free end portion and has further a cup-shaped member including a base portion mounted therein, said further cup-shaped member having a radially outwardly directed edge flange locatable between the two portions of the flange of the first cup member, whereby the two cup members are firmly interconnected, are rotatable within the outer cap and are sealed to the exterior, and a cylinder lock centrally rotatably mounted within the outer cap which is key-actuated, the cylinder lock including radially displaceable coupling bolt which engages between ribs distributed at equally spaced intervals around the wall surface of the further cup-shaped component, which ribs project in a direction perpendicular to the axis of the component adapted to the size and shape of the bolt.

9 Claims, 3 Drawing Figures

CLOSURE CAP HAVING LOCKING MEANS

FIELD OF THE INVENTION

The present invention relates to a closure cover consisting of an outer rotary cap with retracted cover sections rotatably mounted therein which can be tightened by means of sealing flanges provided on the upper wall of the cover against the edges of the opening to be closed, a coupling bolt component capable of being pushed between the two parts of the cover being provided in order to make a connection. In such an arrangement, a key-operated cylindrical lock seated inside the outer cap effects a coupling connection by the radial movement of an eccentric. Moreover, with the inner cover section tightened against the edges of the opening, the outer cap can be made freely rotatable with respect to the inner cover section by rotating the key to withdraw the bolt component.

BACKGROUND OF THE INVENTION

The present invention seeks to provide a closure cover in which a coupling connection between an overlapping outer cap and a cup-shaped retracted inner cover component rotatably mounted therein is controlled by means of a closure bolt, but which is in a simplified form such that the closure cover can be used at the same time for both a bayonet-type closure or a threaded closure. Furthermore, the invention seeks to provide a closure cover in which the locking cylinder, with a locking coupling bolt which is radially movable by means of an eccentric, fits separately in the interior of the closure cover.

According to the present invention, there is provided a closure cover consisting of an inner cover member having a substantially cup-shape capable of engaging with the aperture of be closed, the cover member including a sealing flange adapted to co-operate with the edge of the opening, an overlapping outer cap member rotatably mounted on the circumference of the edge, which cap member has a centrally located, firmly seated, hollow support member for a cylinder lock, the lock being rotatably mounted therein, the cap member being axially supported by a radially displaceable bolt, movement of said bolt being effected by an eccentric, whereby the cover is coupled to the inner cover component, and provided with a sleeve-shaped surrounding component with base closure at the bottom for sealing against the exterior, for a freely rotatable outer cap secured by a key when the inner cover component is firmly tightened on the socket opening, wherein an inner cover member has a first cup-shaped member having a radially directed edge flange including a revertive free end portion and has a further cup-shaped member including a base portion mounted therein, said further cup-shaped member having a radially outwardly directed edge flange locatable between the two portions of the flange of the first cup member, whereby the two cup members are firmly interconnected, are rotatable within the outer cap, and are sealed to the exterior, and a cylinder lock centrally rotatably mounted within the outer cap which is key-actuated, the cylinder lock including radially displaceable coupling bolt which engages between ribs distributed at equally spaced intervals around the wall surface of the further cup-shaped component, which ribs project in a direction perpendicular to the axis of the component adapted to the size and shape of the bolt.

Preferably, the inner cover member is rotatably mounted relative to the outer cap by the provision of flanged edge portions on the inner cover member located opposite to fish plate projections distributed at equal intervals over the circumference of the cap member, which projections extend obliquely to the underside of the inner wall of the cap and are directed upwardly, insertion taking place by means of the application of pressure on correspondingly resilient cap edges seated all around, which projections can be centered and mounted in bearings in a resilient seating in backspringing application faces extending radially relative to the wall of the cap as well as in intermediate space towards limiting nose-like projection axially separated on the wall of the cap.

Advantageously, the bolt is adapted to be inserted between the ribs on the cup into an indentation formed on the further cup component, the bolt being spring-biassed by means of a compression spring, the force of which exceeds the tightening torque of the bayonet bolt in engagement with obliquely upwardly directed application edges of a socket opening.

Desirably, a closure cover for use as a threaded closure cover with torque-limitation wherein the coupling bolt is pushed between the ribs on the cup limits the tightening torque of the threaded cover component in dependence on the force of the compression spring, and wherein as the threaded closure component is tightened, the bolt disengages and in so doing acts as a slipping coupling component and over-engages the cup ribs with a ratchet-like freely rotating outer cap.

Further preferably, a rotatable cylinder lock is seated in a central hole of the outer cap and is assembled as a unit thereunder, the unit comprising at least one coupling-bolt component movable radially by means of one or more eccentrics within a hollow cylindrical component fixed centrally in a form-locking manner in the outer cap, said unit being rotatable and axially supported.

Further advantageously, the lock is mounted in a bearing sleeve of synthetic material and is firmly seated in the central hole of the cap, the cap also being made of synthetic material, by means of radially projecting components fitted into suitably dimensioned indentations formed on a hollow cylindrical retracted drawn-down hole edge border so as to be non-rotational.

Further desirably, on the outer circumference of the bearing sleeve, diagonally opposite in each case, nose-type ribs project at a distance from each other in the circumferential direction on both sides, which ribs can each be firmly pressed into an indentation.

Yet further preferably, the coupling bolt engageable with the eccentric on the lock is mounted in an axially perpendicular partially recessed synthetic material component located inside the bearing sleeve, and has a radial compression spring supported against its wall on a base of the sleeve so as to be able to slide and is mounted in bearings to engage towards the exterior through a slot.

Yet further advantageously, the compression spring acts in a radial direction with a force which is adjustable at will, can be inserted on the one side to be guided in a blind hole on the closure bolt and on the other side is mounted to be supported against the inner wall of the bearing sleeve.

BRIEF DESCRIPTION OF THE DRAWINGS

The invention will be further described, by way of example, with reference to the accompanying drawings, in which.

DETAILED DESCRIPTION

Figure 1:
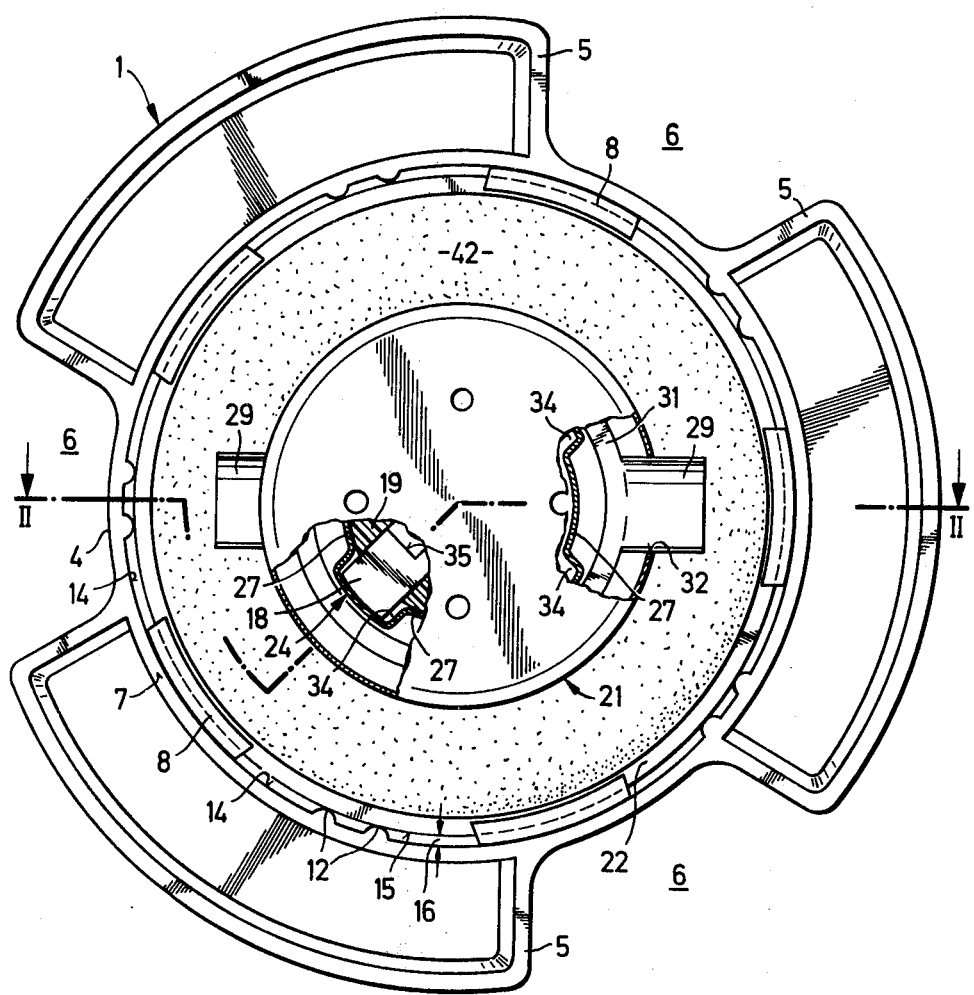
FIG. 1 shows a plan view from below of a bayonet-type closure cover in accordance with the present invention, a portion thereof having been broken away to reveal hidden details.

In the drawings, there is shown a closure cover comprising an outer cap 1 having overlapping, downwardly bent, edge portions 4 and three broad outwardly projecting webs 5. Equal sized intermediate spaces 6 are provided between the webs 5 which form hand holds for rotating the cap 1. The central portion 2 of the cap 1 is slightly arched on its outer surface and has a central aperture 3 in which a cylindrical lock 13 is mounted to rotate. Within the downward bent edge portions 4 of the cap, an inner cover member is mounted, which is centered separately from the inner wall 14 of the edge portions 4 by means of projecting ribs 12 distributed over its circumference. This member 2 is rotatably mounted in bearings. The ribs 12 may be arranged in pairs spaced relatively closely to one another, which pairs of ribs 12 are equidistantly distributed around the circumference. In each case, the ribs 12 are sightly spaced from the inner wall 14 by a small radial distance 16.

Figure 2:
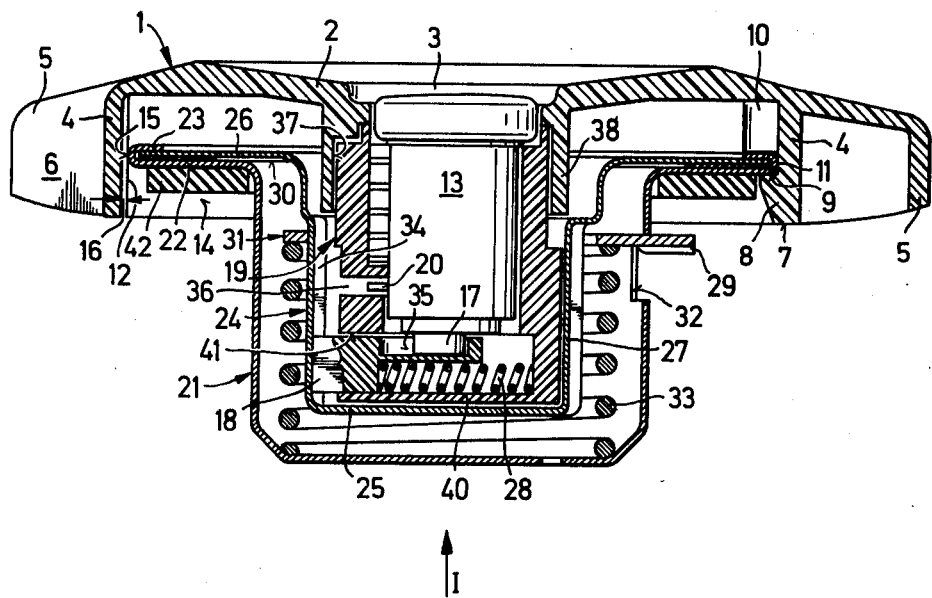
FIG. 2 is a cross-sectional view taken along the line II—II of FIG. 1.

The inner cover member comprises a cup-shaped drawn-in portion 21 carrying, on its upper edge, a radially extending circumferential flange 22 which has a revertive edge portion 23 thereabove. The portions 22 and 23 are spaced apart by a small distance. In the intermediate space between these parts, a flanged edge portion 26 of a concentrically arranged additional cup component 24 having a closed base portion 25 is located. This component 24 is sealed concentrically within the cup portion 21 at a suitable distance from it. If necessary, a flat sealing ring 30 may be interposed between the portion 26 and the flange 22 so as to produce an inner cover member uniformly compressed together by the edge component 23 and tight to the exterior. Arranged in the intermediate space between the two concentrically arranged cup portions 21 and 24 are bridging rings 31 with bayonet bolts 29 projecting diametrically on each side through cut-outs 32 in the wall of the outer cup 21. Compression springs 33 are also provided in this interior space below the bridging rings 31. These springs are supported at their lower ends and prestress the bayonet bolts 29, withdrawal in engagement with the normally obliquely upwardly directed abutting edges of the socket opening which is to be closed. In addition, this auxiliary cylinder comprising the parts 24 and 25 has distributed equidistantly around its inner wall, perpendicular, axially-extending projecting ribs 27 which define corresponding gaps 34. In the embodiment shown, four intermediate gaps 34 are provided. In order to connect the outer cap 1 to the inner cover member, a key is turned in the cylinder lock 13 which causes corresponding movement of an eccentric axially-parallel downwardly extending pin 17. This latter is in engagement with a partially recessed, at 35, axially directed component 18, of a locking bolt. The locking bolt can thus be engaged in a radial direction between one and two desired adjacent rib projections 27. This locking bolt portion 18 mounted to be movable in a radial direction is under the influence of a compression spring 28 which supports it in a radial direction. Under this spring-loading, the bolt portion 18 is impelled forward and, due to the rotary movement of the key-lock cylinder 13, it engages between the ribs 27. This locking position is shown in both FIGS. 1 and 2. The compression spring 28 may therefore, in the manner illustrated in FIG. 2, be radially confined in a suitably dimensioned recess on the underside of the bolt 18, or alternatively may be guided so as to be insertable in a blind bore formed in the bolt component 18.

Figure 3:
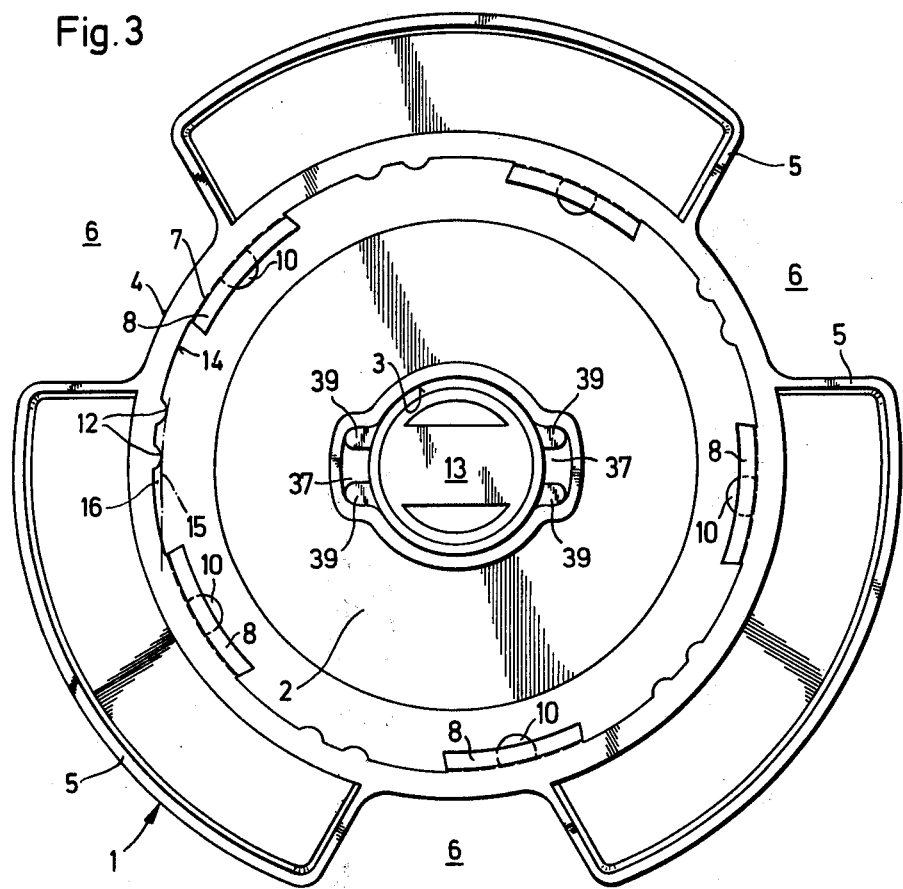
FIG. 3 is a plan view from below of an outer cap member forming part of the closure cover and which has a central support for a cylinder lock.

The locking cylinder which is mounted to rotate in the central aperture 3 of the outer cap 1, 2, together with the bolt component 18 slidably mounted therebelow, is mounted inside a hollow cylindrical bearing sleeve member 19 located centrally inside the outer cap 1, 2 in a form-locking manner. The compression spring 28 for the bolt component 18 may be supported in a radial direction against the inner wall of this bearing sleeve 19. In addition, the locking cylinder is rotatably mounted within this bearing sleeve 19. The cylinder also carries pins 20 which engage in suitable recesses 36 formed in the member 19, so that the cylinder is also supported in a direction perpendicular to its major axis. The bearing sleeve 19 and outer cap 1, 2, may be made of a synthetic material and the form-locking connection between them can be effected by providing outwardly projecting portions on the bearing sleeve 19 which engage in correspondingly dimensioned indentations 37 inside an axially perpendicular, hollow cylindrical, drawn-down edge portion 38 of the cap 1, 2. Conveniently for this purpose, the ribs may be compressible nose-type ribs 39 which are spaced from one another and are provided on the circumference of the sleeve. In FIG. 3, pairs of ribs 39 are shown diagonally opposite each other and such ribs may, in the locked position, each be held fast in an indentation 37 by compressing them.

In addition, the bearing sleeve 19 of the lock may have a base component 40 directed downwardly so that the bolt component 18 made of synthetic material may be applied against it. As previously stated, the component 18 is movable by sliding, and is acted upon by a compression spring 28 supported against the inner wall of the sleeve 19. The bolt component 18 passes outwardly through suitably dimensioned recesses 41 formed in the wall of the sleeve 19 and engages in a spring-loaded locking seat in an intermediate space 34 formed between the rib-type projections 27 on the wall of the inner cup component 24 in order to produce a connection of the outer cap 1 to the inner cover member consisting of the concentric fixedly connected cup-like components 21 and 24. The connection of these latter members is, as previously stated, effected by means of the flanges 22, 23 and 28 moving the locking bolt 18 in the opposite direction, again by using a key in the locking cylinder, the coupling between the two cover components and the outer cap 1 is broken, the outer cap then being free to rotate.

By means of the common mounting assembled in the above-described manner, that is to say, by providing a hollow cylindrical bearing sleeve 19 which is rotatably guided and, simultaneously axially supported and a locking cylinder 13 having an eccentric pin 17 mounted therebelow to co-operate with the bolt 18, which latter is able to slide radially outwardly through apertures 41 formed in the wall of the base portion 40 of the sleeve under the influence of the compression spring 28, a closed constructional unit is produced which can then be centrally inserted, in the above-described manner within the outer cap 1,2 to ensure a secure locking connection.

In, for example, the use of the device of the present invention as a bayonet closure, the bolt component 18 is spring-loaded by a radially-acting compression spring 28 applying a biassing force such that the bayonet bolt 29, which on engagement can be tightened against the obliquely upward directed application surfaces in the usual way, is freed from externally acting torques, until the bayonet bolt 29 is fixed in a manner known in itself, against a limiting stop projection. If the outer cap 1,2 is forced further in the locking direction, the forward-pushed bolt 18 will become disengaged from its engagement position between selected ribs 27 of the inner wall of the cup 24 and will spring over into the next indentation 24 making, at the same time, a ratchet-like noise which gives an audible warning to the operator. It is thus clear that cover tightly seals the edge of the opening with opposite to it, a packing ring 42 being seated below the flange 22 of the inner cover opposite to the axially vertical tightened bayonet bolt 29 on the supporting edge.

In addition, the cover of the present invention may also be used simultaneously as a screw-threaded closure cover having a torque-limiting effect during tightening against a socket opening provided with a thread, of the type already described in the introduction to this specification. For this purpose only, the outer cup component 21 of the inner cover-unit is exchanged for a cup component 21 having an external thread. In order to produce a suitable limitation of torque for threaded cover components of this type, a suitable compression spring is employed in the assembly of the inner cylinder lock and bolt unit since the sealing torque for the screwed cover is dependent on the chosen tensile force of the spring. The inner threaded closure cover is then uncoupled in the direction of closure in a conveniently pulled out state from the outer rotatable cap 1,2, that is automatically by means of the disengagement of the bolt 18, pushed radially forward, as in FIG. 2, from the indentation 34 shown in FIG. 1, on the wall of the inner cup 24. Hereby, the pushed forward nose of the bolt 18, acts as a slipping coupling which, with the freely rotating outer cap 1,2 moves over to the next indentation 34 inside the wall 24 of the cup, since the force of reaction of the tightened threaded cover component (now the outer wall 21 of the cup) from the corresponding threaded socket of the opening to be closed in selected to be greater than the force of the compression spring 28 loading the bolt 18. By drawing back the bolt 18 in the bearing sleeve 19, which is effected by turning the key together with the lock cylinder 13 in the opposite direction, this threaded closure cover is again secured by the key against unauthorised opening, since the outer cap 1,2 only now turns completely freely without the production of ratchet-like noise.

For the rotatable mounting of the inner closure unit by means of an external flange rim 15 inside the outer cap opposite to its drawn-down edge part 4, there are arranged fish plate projections 8 rising obliquely from the underside 7 of the outer cap 1,2 which are distributed at equally spaced intervals on the inner wall 14. These are seated inwards against the base of the cap with closure supports 9 springing backwards towards the wall 14 of the cap, in order to produce a resilient radial spring seat mounting for the flanged edge components 22, 23, 26. The outer circumferential edge 15 of the inner cover unit is here, as already explained, mounted by means of projections 12, projecting only slightly in the form of ribs from the inner wall 14 of the outer cap 1, in a central frame, where the outer edge part of the flange 27 with its revertive end part 23 extending radially inwards can spring inwards resiliently against the grooves 11, as an intermediate space for limiting noses 10 distributed at suitable intervals on the circumference of the inner wall 14 and lying axially above it. For this purpose the outer cap 1, with the edge part 4, are designed from the point of view of material as well as in form, to be resilient all round in the radial direction, so that when the circumferential edge 15 of the flange component 22, 23 is inserted, the inner cover unit then again springs back against the oblique faces 9 on the underside 7 of the outer cap 1, the drawn down edge 4 which expands somewhat under the effect of pressure, or by means of flange components 22, 23 seated at intervals all round in the intermediate space 11, so as to guarantee a spring seated mounting between the outer cap 1 and the inner cover unit with rotatably mounted flange edges 22, 23 and 26, with centered support of the outer circumferences of the edge 15 at a small distance 16 from the inner wall 14 of the outer cap 1, 2.

What I claim is:

1. A closure cover consisting of an inner cover member having a substantially cup-shaped capable of engaging with the aperture to be closed, the cover member including a sealing flange adapted to co-operate with the edge of the opening, an overlapping outer cap member rotatably mounted on the circumference of the edge, which cap member has a centrally located, firmly seated hollow support member for a cylinder lock, the lock being rotatably mounted therein, the cap member being axially supported by a radially displaceable bolt, movement of said bolt being effected by an eccentric, whereby the cover is coupled to the inner cover component, and provided with a sleeve-shaped surrounding component with base closure at the bottom for sealing against the exterior, for a freely rotatable outer cap secured by a key when the inner cover component is firmly tightened on the socket opening wherein an inner cover member has a first cup-shaped member having a radially directed edge flange including a revertive free end portion and has further a cup-shaped member including a base portion mounted therein, said further cup-shaped member having a radially outwardly directed edge flange locatable between the two portions of the flange of the first cup member, whereby the two cup members are firmly interconnected, are rotatable within the outer cap and are sealed to the exterior, and a cylinder lock centrally rotatably mounted within the outer cap which is key-actuated, the cylinder lock including radially displaceable coupling bolt which engages between ribs distributed at equally spaced intervals around the wall surface of the further cup-shaped component, which ribs project in a direction perpendicular to the axis of the component adapted to the size and shape of the bolt.

2. A closure cover as claimed in claim 1, wherein the inner cover member is rotatably mounted relative to the outer cap by the provision of flanged edge portions on the inner cover member located opposite to fish plate projections distributed at equal intervals over the circumference of the cap member which projections extend obliquely to the underside of the inner wall of the cap and are directed upwardly, insertion taking place by means of the application of pressure on correspondingly resilient cap edges seated all round, which projections can be centered and mounted in bearings in a resilient seating in back-springing application faces extending radially relative to the wall of the cap as well as in intermediate space towards limiting nose-like projection axially separated on the wall of the cap.

3. A closure cover as claimed in claim 1 or 2, wherein the bolt is adapted to be inserted between the ribs on the cup into an indentation formed on the further cup component, the bolt being spring-biassed by means of a compression spring, the force of which exceeds the tightening torque of the bayonet bolt in engagement with obliquely upwardly directed application edges of a socket opening.

4. A closure cover as claimed in claim 1 or 2 for use as a threaded closure cover with torque-limitation wherein the coupling bolt which is pushed between the ribs on the cup limits the tightening torque of the threaded cover component in dependence on the force of the compression spring and wherein as the threaded closure component is tightened, the bolt disengages and in so doing acts as a slipping coupling component and over-engages the cup ribs with a ratchet-like freely rotating outer cap.

5. A closure cover as claimed in claim 1, wherein a rotatable cylinder lock is seated in a central hole of the outer cap and is assembled as a unit thereunder, the unit comprising at least one coupling-bolt component movable radially by means of one or more eccentrics within a hollow cylindrical component fixed centrally in a form-locking manner in the outer cap, said unit being rotatable and axially supported.

6. A closure cover as claimed in claim 5, wherein the lock is mounted in bearing sleeve of synthetic material and is firmly seated in the central hole of the cap, the cap also being made of synthetic material, by means of radially projecting components fitted into suitably dimensioned indentations formed on a hollow cylindrical retracted drawn-down hole edge border so as to be non-rotational.

7. A closure cover as claimed in claim 6, wherein on the outer circumference of the bearing sleeve, diagonally opposite in each case, nose-type ribs project at a distance from each other in the circumferential direction on both sides, which ribs can each be firmly pressed into an indentation.

8. A closure cover as claimed in claim 5, wherein the coupling bolt engageable with the eccentric on the lock is mounted in an axially perpendicular, partially recessed synthetic material component located inside the bearing sleeve and has a radial compression spring supported against its wall on a base of the sleeve so as to be able to slide and is mounted in bearings to engage towards the exterior through a slot.

9. A closure cover as claimed in claim 8, wherein the compression spring acts in a radial direction with a force which is adjustable at will, can be inserted on the one side to be guided in a blind hole on the closure bolt and on the other side is mounted to be supported against the inner wall of the bearing sleeve.

* * * * *